Dec. 12, 1950     T. W. DWELLE     2,533,564
ROTATIONAL SPEED GOVERNOR
Filed May 23, 1949
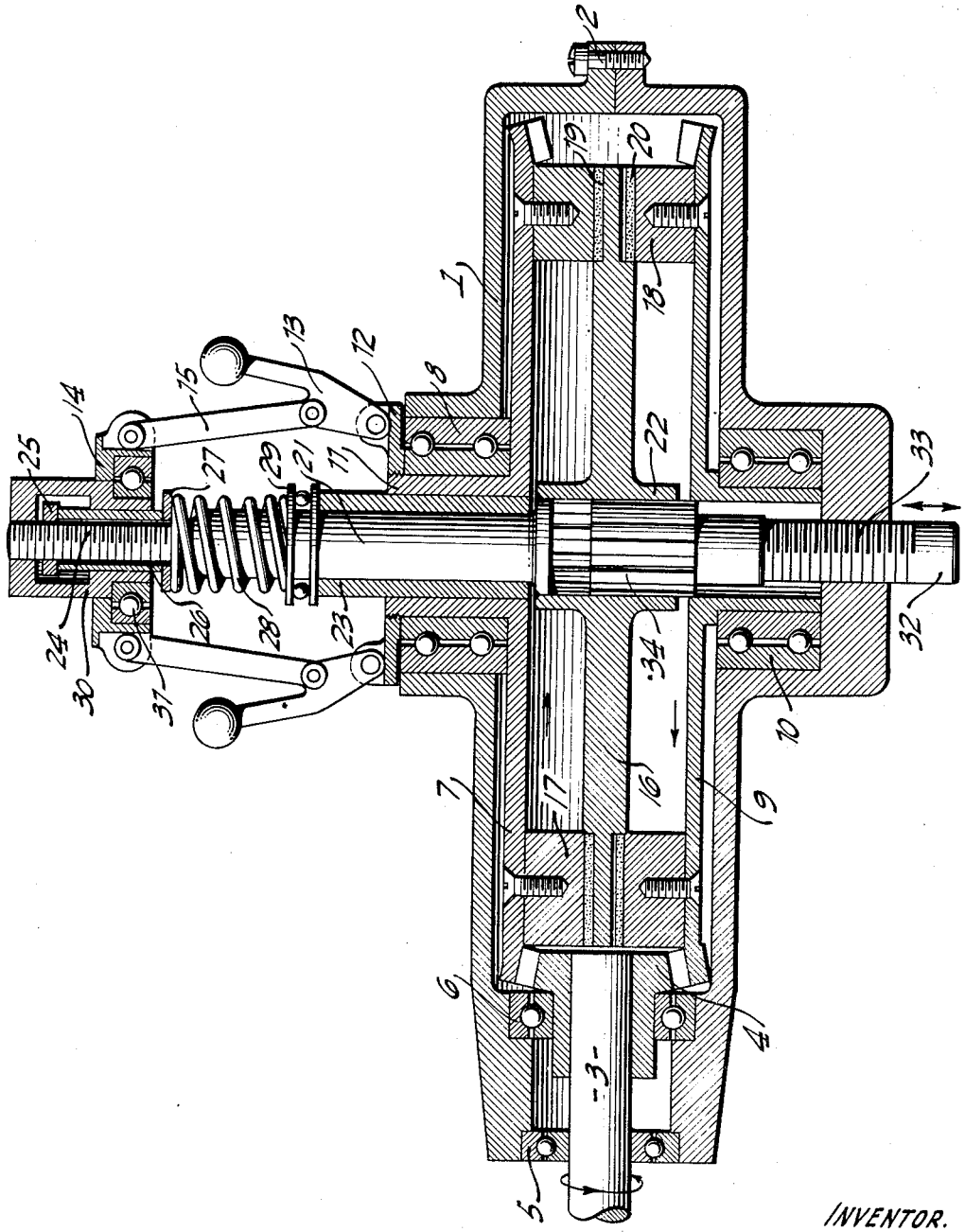
INVENTOR.
THOMAS W. DWELLE,
BY
ATTORNEY.

Patented Dec. 12, 1950

2,533,564

UNITED STATES PATENT OFFICE 2,533,564

ROTATIONAL SPEED GOVERNOR

Thomas W. Dwelle, Visalia, Calif.

Application May 23, 1949, Serial No. 94,819

3 Claims. (Cl. 74—404.5)

This invention relates to a rotational speed governor whereby the speed of a prime mover may be held at a substantially constant R. P. M.

An object of my invention is to provide a rotational speed governor in which a shaft is caused to move longitudinally as the speed of the prime mover varies and the movement of this shaft actuating the throttle of the prime mover.

Another object of my invention is to provide a novel rotational speed governor, which will move a shaft longitudinally and in direction determined by the engagement of a clutch with either of two driven gears.

A feature of my invention resides in the control of a clutch in a rotational speed governor with flyball governors, the flyballs being rotated by the driving shaft extending from the prime mover.

Another feature of my invention is to provide a novel rotational speed governor of the character stated in which a clutch member is frictionally engaged with either of two gears driven by the prime mover.

Other objects, advantages and features of invention may appear from the accompanying drawing, the subjoined detailed description and the appended claims.

In the drawing

The single figure is a transverse sectional view of my rotational speed governor.

Referring more particularly to the drawing, numeral 1 indicates a housing in which most of the subsequently described parts are housed. The housing 1 is preferably formed in two parts, bolted together by a series of bolts or cap screws 2, all of which is the usual procedure in mechanisms of this type.

A shaft 3 extends into the housing 1 and this shaft is driven by the prime mover (not shown). A pinion gear 4 is fixedly attached to the inner end of the shaft 3 and is positioned within the housing 1, substantially as shown. The shaft 3 and the gear 4 are journalled in the housing 1 on the bearings 5 and 6. An upper ring gear 7 is journalled in the housing 1 on bearings 8, and a lower ring gear 9 is journalled in the housing 1 on bearings 10. The ring gears 7 and 9 are constantly in mesh with the pinion 4 and consequently are constantly rotated whenever the shaft 3 is rotating. Assuming that the shaft 3 rotates in direction of the arrows shown, then the ring gears 7 and 9 will be rotated in direction of the arrows adjacent each of these gears.

A hub 11 rises from the gear 7 and ears 12 project outwardly from this hub. A plurality of flyballs 13 are pivotally mounted on the ears 12 and each flyball is connected to a cap 14, through a link 15.

A disc clutch 16 is mounted within the housing 1 and is positioned between the ring gears 7 and 9. The gear 7 has a depending annular flange 17 extending therefrom, and the gear 9 has a similar annular flange 18 extending upwardly therefrom. The faces of the flanges 17 and 18 are positioned close to the periphery of the clutch 16. At the outer edge of the clutch 16, I provide an upper brake band 19 and a lower brake band 20. These brake bands are adapted to engage the flanges 17 and 18, respectively, that is, as the clutch 16 is moved vertically, in a manner to be subsequently described, the brake bands or faces 19 or 20 will engage either flange 17 or 18 and will be driven in the direction of rotation of the gear 7 or 9, depending upon which flange is engaged.

A control shaft 21 rises from the clutch hub 22 and thus rotates with the clutch. A sleeve 23 is fixedly attached to the control shaft 21 and is journalled in the hub 11. The upper end of the shaft 21 is threaded, as shown at 24, and a nut 25 screws on to this threaded end and bears against a sleeve 26, which in turn adjusts the collar 27, and the collar spring 28, which bears against this collar, is thus adjusted as to its tension against the collar. The lower end of the spring 28 rests on a thrust bearing 29. A head 30 is mounted on top of the control shaft 21 and the cap 14 is journalled on this head through the medium of the bearing 31.

A throttle shaft 32 is threaded in the housing 1 on threads 33. The throttle shaft 32 is in line with the control shaft 21 and is splined in the hub 22, as shown at 34. Thus, the throttle shaft 32 can be moved longitudinally within the clutch 16, as will be further described.

Operation

Considering that the prime mover is turning the shaft 3 in the direction of the arrows, the ring gears 7 and 9 will then be rotated in the direction shown by the arrows adjacent these gears. The spring 28 will be pressing upwardly against the collar 27, thus urging the control shaft 21 upwardly and thereby pressing the clutch 16 against the flange 17, that is, the friction or brake lining 19 will engage the flange 17. The clutch 16 is then driven in the direction of the gear 7. The throttle shaft 32 will then be rotated through its spline connection 34, and, due to the threads 33, will move the throttle shaft 32 inwardly into the housing 1. A throttle, not shown, is connected to the shaft 32 and the prime mover will have its speed increased by this movement of the shaft 32. As the speed of the prime mover increases, the flyballs 13 will move outwardly, thus pressing downwardly on the control shaft 21, and when the tension of the spring 28 is overcome the shaft 21 will be pushed downwardly until the clutch 16 engages the flange 18 of the gear 9. The clutch 16 will then be rotated in the opposite direction from that previously described, consequently the throttle shaft 32 will be rotated in the opposite direction and will be screwed out of the housing 1, thus moving the throttle in the opposite direction to decrease the speed of the prime mover.

Having described my invention, I claim:

1. A rotational speed governor comprising a housing, a pair of ring gears journalled in said housing and spaced from each other, a drive shaft journalled in the housing, a pinion on the drive shaft engaging both of said gears whereby the gears are driven in opposite directions, a clutch disc mounted between said gears and frictionally engaging either of said gears, a flyball governor mounted on one of said gears and driven thereby, a control shaft rising from said clutch disc, means operatively connecting the governor and the control shaft whereby operation of the governor will move said shaft longitudinally to engage either of said gears with the clutch disc, said clutch disc having a splined hub, a throttle shaft, said throttle shaft having a splined connection with said hub, said throttle shaft being threaded in the housing and movable into or out of the housing on rotation of said throttle shaft.

2. A rotational speed governor comprising a housing, a pair of spaced ring gears journalled in the housing, drive shaft extending into the housing, a pinion on the drive shaft engaging both of said gears to drive the same in opposite directions, a clutch disc mounted between said gears, an annular lining on the top and bottom faces of said disc, each lining being engageable by a ring gear, a flyball governor connected to one of said ring gears and driven thereby, a control shaft rising from said clutch disc, a cap on the control shaft, said cap being engaged by the flyball governor to move the control shaft longitudinally and engage the clutch disc with either of said ring gears, a splined hub in the clutch disc, a throttle shaft, said throttle shaft having a splined connection with said hub, said throttle shaft being threaded in the housing, rotation of said shaft moving the same into or out of the housing.

3. A rotational speed governor comprising a housing, a pair of spaced ring gears journalled in the housing, a drive shaft extending into the housing, a pinion on the drive shaft engaging both of said gears to drive the same in opposite directions, a clutch disc mounted between said gears, an annular lining on the top and bottom faces of said disc, each lining being engageable by a ring gear, a flyball governor mounted on one of said ring gears and driven thereby, a control shaft rising from said clutch disc, a cap on the control shaft, said flyball governor being pivotally attached to said cap to move the control shaft longitudinally and engage the clutch disc with either of said ring gears, a spring surrounding the control shaft, a nut threaded on said control shaft, said nut being engageable with the spring to adjust the tension thereof, a splined hub in the clutch disc, a throttle shaft, said throttle shaft having a splined connection with said hub, said throttle shaft being threaded in the housing and rotation of said shaft moving the same into or out of the housing.

THOMAS W. DWELLE.

REFERENCES CITED

The following references are of record in the file of this patent:

UNITED STATES PATENTS

| Number  | Name    | Date           |
|---------|---------|----------------|
| 17,817  | Ward    | July 14, 1857  |
| 361,251 | McKenna | Apr. 12, 1887  |
| 411,056 | Quast   | Sept. 17, 1889 |
| 485,361 | Waters  | Nov. 1, 1892   |